(12) United States Patent
Lin et al.

(10) Patent No.: US 6,968,251 B2
(45) Date of Patent: Nov. 22, 2005

(54) DEFECT ANALYSIS SAMPLING CONTROL

(75) Inventors: Chin-Hsiang Lin, Shanghai (CN);
Ching-Cheng Shih, Shanghai (CN)

(73) Assignee: Grace Semiconductor Manufacturing Corporation, Shanghai (CN)

( * ) Notice: Subject to any disclaimer, the term of this patent is extended or adjusted under 35 U.S.C. 154(b) by 0 days.

(21) Appl. No.: 10/918,413

(22) Filed: Aug. 16, 2004

(65) Prior Publication Data
US 2005/0049737 A1 Mar. 3, 2005

(30) Foreign Application Priority Data
Aug. 27, 2003 (CN) .............................. 03150599 A

(51) Int. Cl.[7] .......................... G06F 19/00; G01N 37/00
(52) U.S. Cl. ...................................... 700/109; 702/83
(58) Field of Search ........................ 700/109, 110, 121; 702/83

(56) References Cited
U.S. PATENT DOCUMENTS
6,477,432 B1 * 11/2002 Chen et al. .................... 700/51
6,577,972 B2 * 6/2003 Yanaru et al. ................. 702/83
2002/0193899 A1 * 12/2002 Shanmugasundram et al. .. 700/108
2005/0033467 A1 * 2/2005 Purdy ......................... 700/109

\* cited by examiner

*Primary Examiner*—Leo Picard
*Assistant Examiner*—Ryan A. Jarrett
(74) *Attorney, Agent, or Firm*—Rosenberg, Klein & Lee

(57) ABSTRACT

A defect analysis sampling control system comprising a base setting module, a lot setting module, and a work in process (WIP) prediction module. The base setting module is used for choosing and setting a corresponding sampling rule in accordance with different semiconductor products and the lot setting module is used for choosing and setting a corresponding lot sampling rule in accordance with a product lot. The work in process (WIP) prediction module records all WIP products to provide status and progress of the WIP product. The present invention can be applied to a variety of products so as to control and adjust the sampling rule for all products more conveniently and arrange the sampling rules more flexibly.

17 Claims, 3 Drawing Sheets

DEFECT ANALYSIS SAMPLING CONTROL

BACKGROUND OF THE INVENTION

1. Field of the Invention

The present invention generally relates to a sampling control system, and more particularly relates to a defect analysis sampling control system suitable for the sampling rules of various products in semiconductor manufacturing processing.

2. Description of the Prior Art

Investment in a wafer factory requires a large amount of capital, a lot of equipment, and skilled personnel. Semiconductor products require hundreds or thousands of processes in order to finish the manufacturing of the product. As the semiconductor size shrinks to the deep sub-micron level more and more electronic circuits on the same size wafer. Hence, if product yield is to be enhanced, the defect ratio must be reduced. So, defect analysis becomes very important in semiconductor manufacturing processing.

A defect analysis control system plays an important role in the yield control of a foundry. Owing to different fabricating technology, different manufacturing procedures, various types of product, and the difference in sampling rules for different products, the detect analysis control system is required to adjust to the corresponding sampling rule in accordance with the specific product in order to trace the product yield and to master the manufacturing process of the product. As a result, the control and adjustment of the sampling rules for each product becomes more complex and difficult.

In the conventional defect analysis control systems, owing to the varieties of product in the foundry, in order to match the different sampling rules and conditions for all kinds of products, the control and the adjustment of the prior art defect analysis control system becomes insufficient and difficult. In accordance with the problems mentioned above, the present invention provides a defect analysis sampling control system in order to overcome the disadvantages of the conventional technology.

SUMMARY OF THE INVENTION

An objective of the present invention is to provide a defect analysis sampling control system. The present invention selects and sets individual sampling rules in accordance with different semiconductor products to master the control and the adjustment of the sampling rules of all products. In this way the present invention overcomes the difficulties of defect analysis control and makes the arrangement of the sampling rules more flexible.

Another object of the present invention is to provide a defect analysis sampling control system that utilizes a base setting module and a lot setting module to provide choices of sampling rules for all kinds of semiconductor products and simplifies the related setting functions.

A further object of the present invention is to provide a defect analysis sampling control system that utilizes a work in process (WIP) prediction module to predict and control the manufacturing procedures corresponding to each of the specific product lots so as to exactly control the status of all products.

In order to achieve the above-mentioned objects and more, the present invention comprises a base setting module, wherein the base setting module is used for choosing and setting a corresponding sampling rule from all sampling rules arranged in the base setting module in accordance with different semiconductor products. A lot setting module is provided, wherein the lot setting module is used for choosing and setting a corresponding lot sampling rule in accordance with a product lot of the lot setting module. Also, a work in process (WIP) prediction module is provided, wherein the WIP prediction module records all WIP product to provide a status and progress check for the WIP product.

Other advantages of the present invention will become apparent from the following description taken in conjunction with the accompanying drawings wherein are set forth, by way of illustration and example, certain embodiments of the present invention.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DESCRIPTION OF THE PREFERRED EMBODIMENTS

Figure 1:
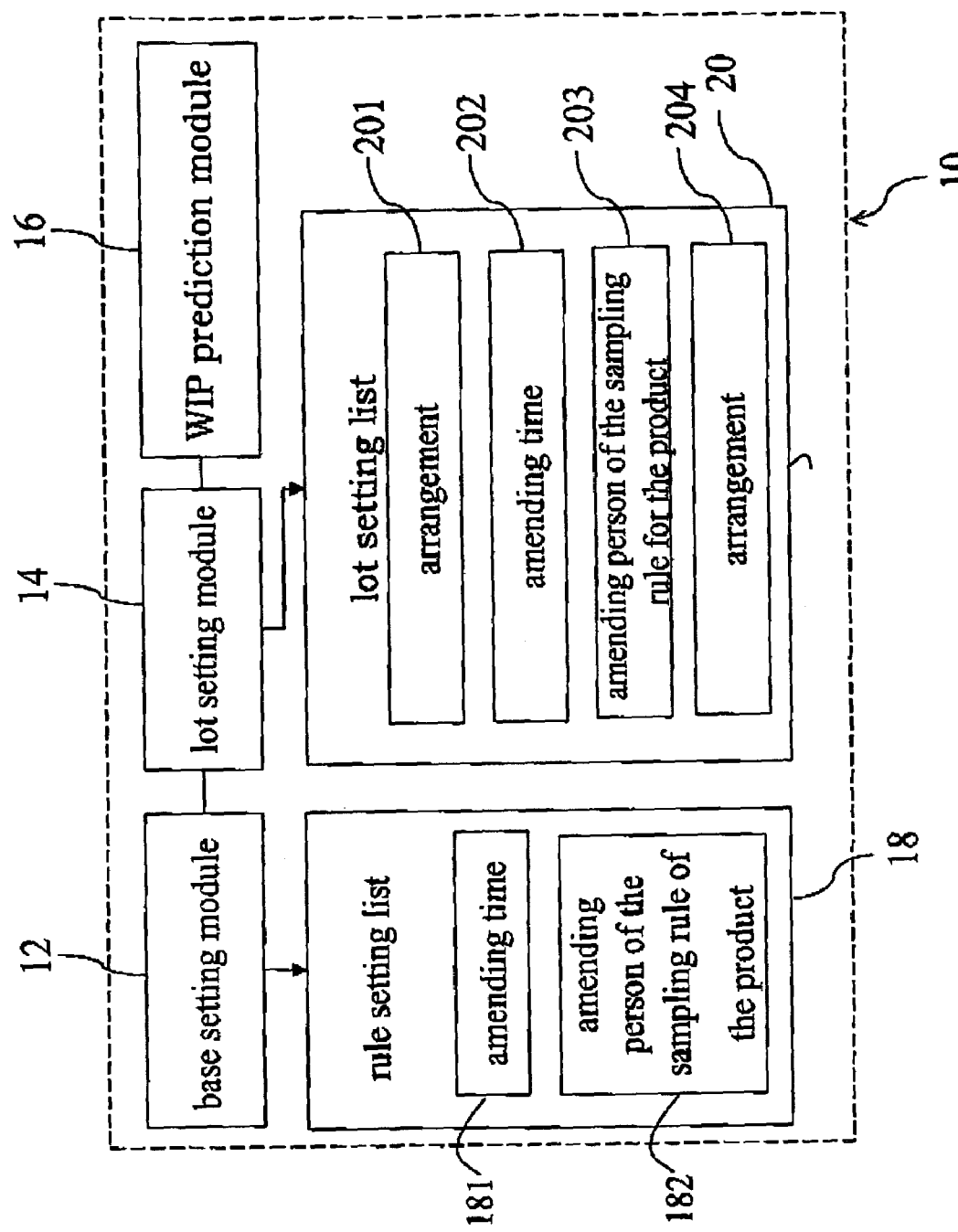
FIG. 1 is a block diagram illustrating the structure of a defect analysis sampling control system according to an embodiment of the present invention.

While the present invention may be embodied in many different forms, there is shown in the drawings and discussed herein a few specific embodiments with the understanding that the present disclosure is to be considered only as an exemplification of the principles of the invention and is not intend to limit the invention to the embodiments illustrated.

The present invention provides a defect analysis sampling control system and method. The present invention can choose and set the individual sampling rule in accordance with different semiconductor products in order to master the control and the adjustment of the sampling rule for all products. When the product category of the foundry become more numerous, the present invention can quickly perform the sampling detection procedure of the product to overcome the difficulties of defect analysis control and make the arrangement of the sampling rules more flexible.

FIG. 1 is block diagram of the defect analysis sampling control system of the present invention. As shown in the FIG. 1, the defect analysis sampling control system 10 comprises a base setting module 12 performing a base setting step to choose and set a corresponding sampling rule from all sampling rules arranged in the base setting module 12 in accordance with different semiconductor products; a lot setting module 14 performing a lot setting step to choose and set a corresponding lot sampling rule in accordance with a product lot of the lot setting module 12; and a work in process (WIP) prediction module 16 for recording all information of the WIP product and recording the priority sequence and the tool message so as to provide the user with comprehensive information of the corresponding process for the specific product.

After finishing the selecting and setting of the base setting module 12 and the lot setting module 14, in accordance with product sampling rules arranged within the base setting module 12, a rule setting list 18 is built up for checking the sampling rule of some specific product. Within the rule setting list 18, are recording arrangement, amending time 181, and amending person for performing a sampling rule of the product 182 at the preceding time. The function design provides a retroactive effect of the amendment of the sampling rule. In accordance with the lot sampling rules arranged within the lot setting module 14, a lot setting list 20 is built up for checking the corresponding sampling rule of one lot product. Within the lot setting list 20 are, recording an arrangement 201, amending time 202, and amending person of performing sampling rule of the product 203 at the preceding time, and the lot setting list 20 provides a corresponding remarks column 204 for user to know the change reason of the sampling rule of one lot product.

To the setting steps performed by the base setting module 12 and the lot setting module 14, these two settings are according to different kinds of products, lots to choose and set the different sampling rule. Hence, the rules arranged therein become more important. The following description will illustrate in detail the setting steps of the base setting module 12 and the lot setting module 14.

Figure 2:
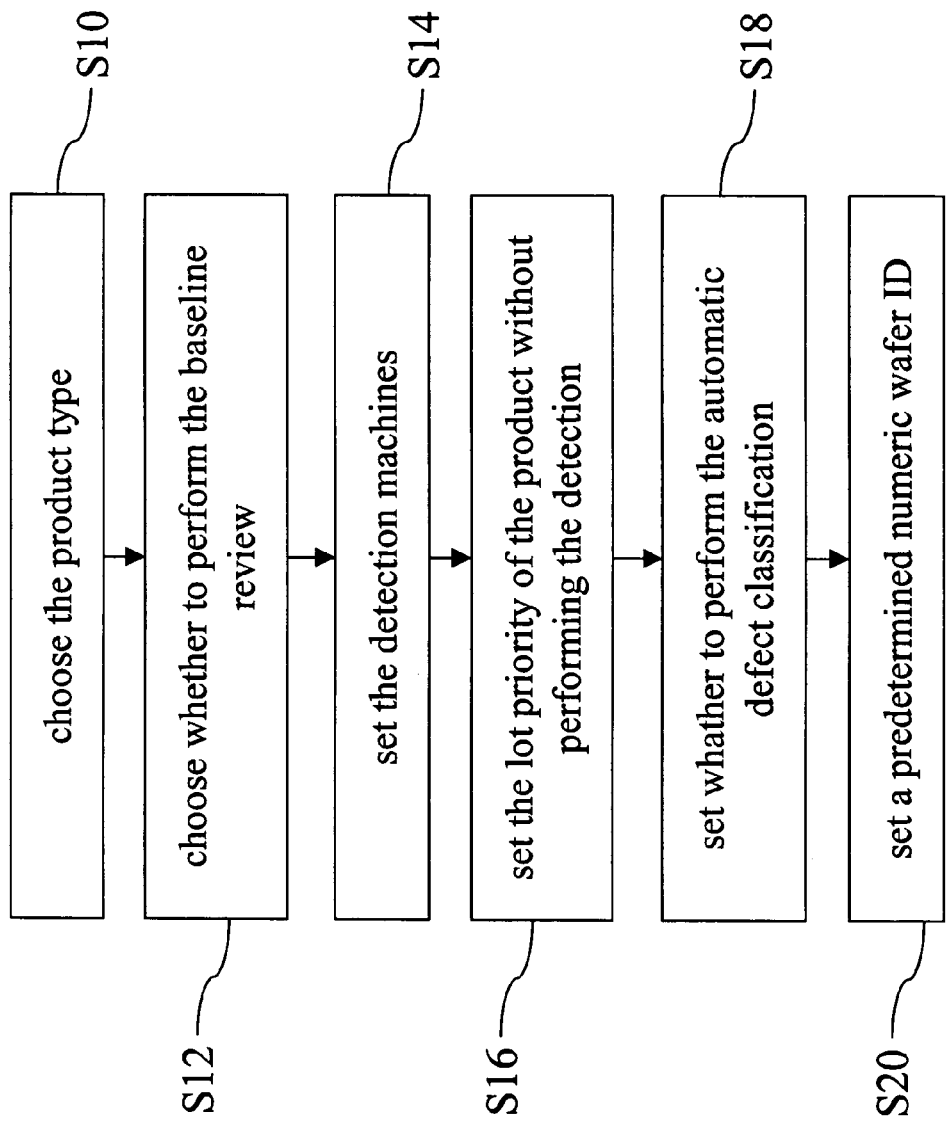
FIG. 2 is a flowchart illustrating setting steps of the base setting module according to an embodiment of the present invention.

First, to the base setting module 12, the base setting step is usually for choosing the product lot and the wafer ID to set the sampling rule. Simultaneously referring to FIG. 2, the setting of the sampling rule of the base setting module 12 is as in step S10 to choose the product types, which comprises the category of the semiconductor product, the specification and the size of the device, lot, and the manufacturing technology. Then, in step S12 to choose whether to perform the baseline review, wherein the baseline review performs the collection of the baseline data in accordance with the specific product or the specific layer for distinguishing the out of control (OOC) data in the product line so as to provide the flexibility of the data collection and mark its special characteristics.

Further, as shown in step S14, the kind of detection machine to perform the detection is set so the choice of detection machine becomes more flexible. Such as shown in step S16, since the setting does not need to perform the detection of the lot priority of the product, it makes the sampling control of the different lot priority of the products more convenient. The next setting is whether to perform the automatic defect classification (ADC), such as shown in step S18, to choose whether to perform an optical microscope automatic defect classification (OM ADC) or a scanning electron microscope automatic defect classification (SEM ADC). This step is convenient for the user to promptly obtain the product message, such as whether the product has had automatic defect classification performed. Lasty, such as shown in step S20 a predetermined numeric wafer ID is set, wafer IDs are chosen to correspond with the different products so as to provide different detection machines with a standard identification scheme of sampled wafer IDs.

The sequence of all setting steps of step S10 to step S20 mentioned above can be amended to a sequence in accordance with the interest or the requirements of the user. The procedure sequence mentioned herein is not intended to limit the present invention.

Figure 3:
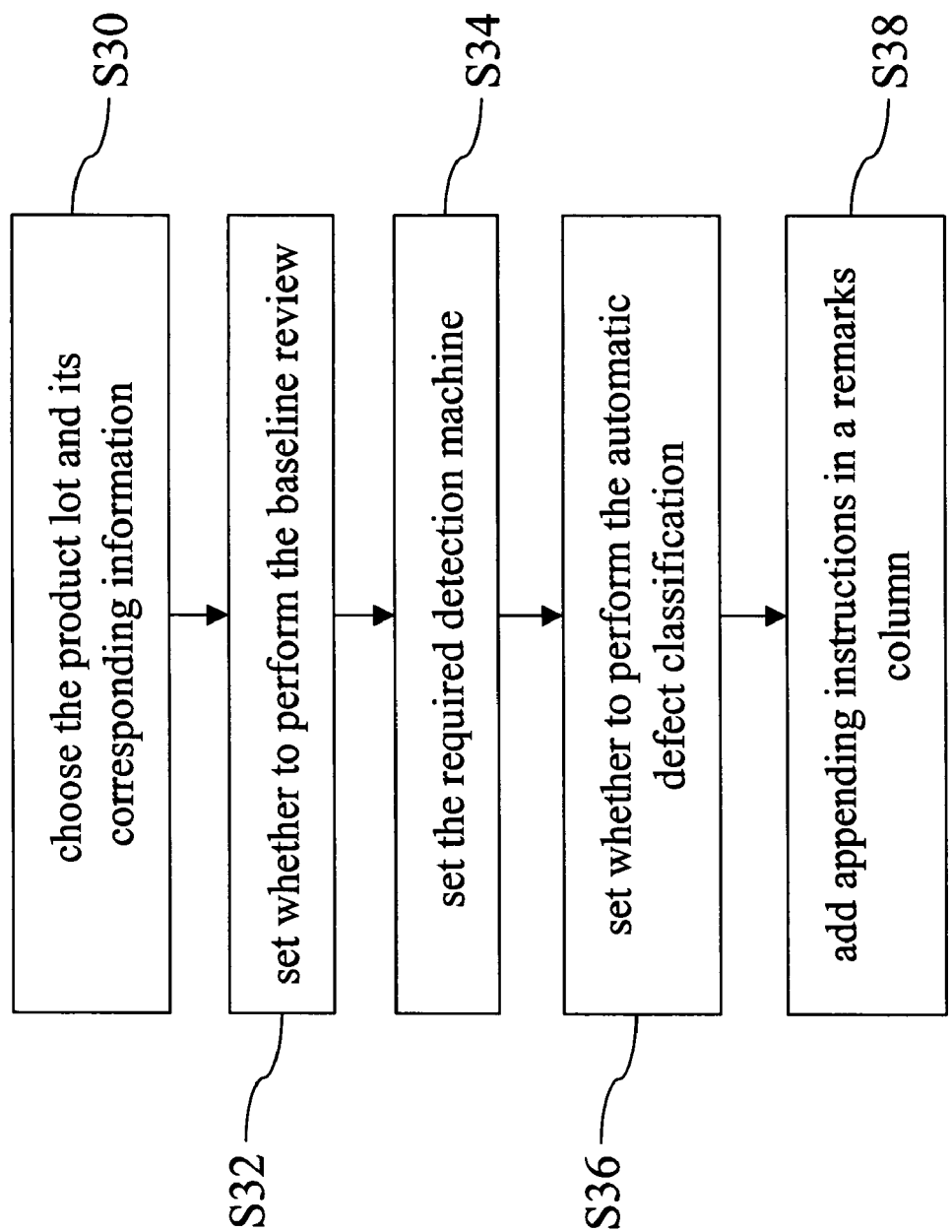
FIG. 3 is a flowchart illustrating setting steps of the lot setting module according to an embodiment of the present invention.

Regarding the lot setting module, generally, the lot setting step is for choosing the wafer ID to set the sampling rule. Simultaneously, referring to FIG. 3, the lot setting rule setting of the lot setting module is as in step S30 where the product lot and its corresponding information and process are chosen. Following, step S32, to set whether to perform the baseline review, step S34 to set the change reason for the required detection machine, and step S36 to set whether to perform the automatic defect classification (ADC) are sequentially performed. Last, as shown in step S38, appended instructions are added in a remarks column. It is convenient for the user to obtain the reason for the change to the sampling specification of the lot product. The sequence of step S30 to step S38 mentioned above can be amended to a sequence in accordance with the interest or the requirement of the user. The detailed description of step 32 to step 36 is the same as the steps of the base setting module, and can be referred to in the above.

The present invention utilizes a base setting module and a lot setting module to provide choices of sampling rules for all kinds of semiconductor products. Additionally, the related setting functions are simplified and further utilize a work in process (WIP) prediction module to predict and control the manufacturing procedures corresponding to each of the specific product lots so as to accurately control the status of all products. Hence, the present invention can overcome the disadvantages of conventional defect analysis sampling control. Furthermore, the present invention can be applied to a variety of products so as to control and adjust sampling rules for all products and makes the control more convenient and the arrangement of the sampling rules more flexible.

The forgoing description of the embodiments of the invention has been presented for purposes of illustration and description, and is not intended to be exhaustive or to limit the present invention to he precise from disclosed. The description was selected to best explain the principles of the invention and practical application of these principles to enable others skilled in the art to best utilize the invention in various embodiments and modifications as are suited to the particular use contemplated. It is intended that the scope of the invention not to be limited by the specification, but be defined by the claim set forth below.

What is claimed is:

1. A defect analysis sampling control system comprising:
    a base setting module for choosing and setting a sampling rule from all sampling rules arranged in the base setting module in accordance with different semiconductor products;
    a lot setting module for selecting and setting a lot sampling rule in accordance with a product lot in the lot setting module;
    a work in process prediction module for recording work in process products in order to provide status and progress of work in process product; and
    a rule setting list for checking the sampling rule of the product, which is decided in accordance with content in the base setting module, the rule setting list including an amending time and an amending person of the sampling rule for the product.

2. The defect analysis sampling control system of claim 1, further comprising:
    a lot setting list for checking the sampling rule of one lot product which is in accordance with content of the lot setting module.

3. The defect analysis sampling control system of claim 2, the lot setting list comprising recording an arrangement, an amending time, an amending person of the sampling rule for the product, and a corresponding remarks column.

4. The defect analysis sampling control system of claim 1, wherein the base setting module is used for choosing product lot and wafer identification to set the sampling rule.

5. The defect analysis sampling control system according to claim 1, wherein the sampling rule setting of the base setting module comprises:
    a choice of a semiconductor product, an element specification, and a process;
    a setting of deciding to perform a base line review;
    a setting of a machine requiring detecting;

a setting of a lot priority of the product;
a setting of deciding to perform an automatic defect classification; and
a setting of a predetermined numeric wafer identification.

6. The defect analysis sampling control system of claim 1, wherein the lot setting module sets the sampling rule from a selected wafer identification.

7. The defect analysis sampling control system of claim 1, the sampling rule setting of the lot setting module comprises:
a setting of a product lot and its corresponding data and processes;
a setting of deciding to perform a base line review;
a setting of a machine requiring detecting;
a setting of deciding to perform an automatic defect classification; and
an appending instruction in a remarks column.

8. The defect analysis sampling control system of claim 5, wherein the automatic defect classification is selected from a group of optical microscope automatic defect classification and scanning electron microscope automatic defect classification.

9. The defect analysis sampling control system of claim 1, wherein the work in progress product prediction module records a lot priority sequence and a tool message.

10. A defect analysis sampling control system comprising:
a base setting module for choosing and setting a sampling rule from all sampling rules arranged in the base setting module in accordance with different semiconductor products, the base setting module setting the sampling rule based on chosen product lot and wafer identification;
a lot setting module for selecting and setting a lot sampling rule in accordance with a product lot in the lot setting module;
a work in process prediction module for recording work in process products in order to provide status and progress of work in process product;
a rule setting list for checking the sampling rule of the product, which is decided in accordance with content in the base setting module, the rule setting list comprising an amending time and an amending person of the sampling rule for the product; and
a lot setting list for checking the sampling rule of one lot product which is in accordance with content of the lot setting module, the lot setting list comprising recording an arrangement, an amending time, an amending person of the sampling rule for the product, and a corresponding remarks column.

11. The defect analysis sampling control system according to claim 10, wherein the sampling rule setting of the base setting module comprises:
a choice of a semiconductor product, an element specification, and a process;
a setting of deciding to perform a base line review;
a setting of a machine requiring detecting;
a setting of a lot priority of the product a setting of deciding to perform an automatic defect classification; and
a setting of a predetermined numeric wafer identification.

12. The defect analysis sampling control system of claim 10, wherein the lot setting module sets the sampling rule from a selected wafer identification.

13. The defect analysis sampling control system of claim 10, the sampling rule setting of the lot setting module comprises:
a setting of a product lot and its corresponding data and processes;
a setting of deciding to perform a base line review;
a setting of a machine requiring detecting;
a setting of deciding to perform an automatic defect classification; and
an appending instruction in a remarks column.

14. The defect analysis sampling control system of claim 11, wherein the automatic defect classification is selected from a group of optical microscope automatic defect classification and scanning electron microscope automatic defect classification.

15. The defect analysis sampling control system of claim 10, wherein the work in progress product prediction module records a lot priority sequence and a tool message.

16. A defect analysis sampling control system comprising:
a base setting module for choosing and setting a sampling rule from all sampling rules arranged in the base setting module in accordance with different semiconductor products, the base setting module setting the sampling rule based on chosen product lot and wafer identification; the sampling rule setting of the base setting module comprising:
a choice of a semiconductor product, an element specification, and a process;
a setting of deciding to perform a base line review;
a setting of a machine requiring detecting;
a setting of a lot priority of the product
a setting of deciding to perform an automatic defect classification; and
a setting of a predetermined numeric wafer identification;
a lot setting module for selecting and setting a lot sampling rule in accordance with a product lot in the lot setting module; the lot setting module setting the sampling rule from a selected wafer identification; the lot sampling rule setting comprising:
a setting of a product lot and its corresponding data and processes;
a setting of deciding to perform a base line review;
a setting of a machine requiring detecting;
a setting of deciding to perform an automatic defect classification; and
an appending instruction in a remarks column;
a work in process prediction module for recording work in process products in order to provide status and progress of work in process product; the work in progress product prediction module recording a lot priority sequence and a tool message;
a rule setting list for checking the sampling rule of the product, which is decided in accordance with content in the base setting module, the rule setting list comprising an amending time and an amending person of the sampling rule for the product; and
a lot setting list for checking the sampling rule of one lot product which is in accordance with content of the lot setting module, the lot setting list comprising recording an arrangement, an amending time, an amending person of the sampling rule for the product, and a corresponding remarks column.

17. The defect analysis sampling control system of claim 16, wherein the automatic defect classification is selected from a group of optical microscope automatic defect classification and scanning electron microscope automatic defect classification.

* * * * *